United States Patent [19]

Tuckey

[11] Patent Number: 4,827,768

[45] Date of Patent: May 9, 1989

[54] MOTOR-DRIVEN MATERIAL LEVEL INDICATOR

[75] Inventor: Charles H. Tuckey, Cass City, Mich.

[73] Assignee: Walbro Corporation, Cass City, Mich.

[21] Appl. No.: 200,942

[22] Filed: Jun. 1, 1988

Related U.S. Application Data

[63] Continuation-in-part of Ser. No. 56,160, Jun. 1, 1987, abandoned.

[51] Int. Cl.⁴ .................... G01F 23/22; G01F 23/00
[52] U.S. Cl. ................................. 73/290 R; 340/615
[58] Field of Search ............... 73/290 R, 59; 340/615; 318/482; 366/307

[56] References Cited

U.S. PATENT DOCUMENTS

| | | | |
|---|---|---|---|
| 1,779,181 | 10/1930 | McDonald | 366/307 |
| 2,125,722 | 8/1938 | Hawkins | 73/290 R |
| 2,624,790 | 1/1953 | White | 73/290 R |
| 2,793,166 | 5/1957 | Hatch | 366/307 |
| 2,851,553 | 9/1958 | Grostick | 340/615 |
| 2,871,109 | 1/1959 | Snyder et al. | 366/307 |
| 2,909,766 | 10/1959 | Bozich | 340/615 |
| 2,975,636 | 3/1961 | Allen | 73/240 R |
| 2,992,651 | 7/1961 | Krofta | 73/59 |
| 3,090,223 | 5/1963 | Juffa et al. | 73/59 |
| 3,400,462 | 9/1968 | Pobst, Jr. | 73/290 R |
| 3,560,752 | 2/1971 | Lee | 340/615 |
| 3,818,159 | 6/1974 | Evans et al. | 340/615 |
| 4,157,036 | 6/1979 | Kivenson | 73/290 R |
| 4,534,210 | 8/1985 | Reeves | 73/59 |

FOREIGN PATENT DOCUMENTS

| | | | |
|---|---|---|---|
| 376215 | 12/1921 | Fed. Rep. of Germany | 73/290 R |
| 840608 | 6/1952 | Fed. Rep. of Germany | 73/290 R |
| 498493 | 3/1976 | U.S.S.R. | 73/290 R |

*Primary Examiner*—William A. Cuchlinski, Jr.
*Assistant Examiner*—Thomas B. Will
*Attorney, Agent, or Firm*—Barnes, Kisselle, Raisch, Choate, Whittemore & Hulbert

[57] ABSTRACT

Apparatus for indicating level of fluent materials, such as gasoline in an automobile tank, which comprises an impeller extending vertically through at least a major portion of the vessel in physical contact with material in the vessel. An electric motor is coupled to the impeller and connected to a source of electrical energy for rotating the impeller against drag imparted thereto by the material. Material level is indicated as a continuous function of load applied to the motor by the rotating impeller.

8 Claims, 1 Drawing Sheet

U.S. Patent
May 9, 1989
4,827,768
FIG. 1
FIG. 3
FIG. 4
FIG. 2
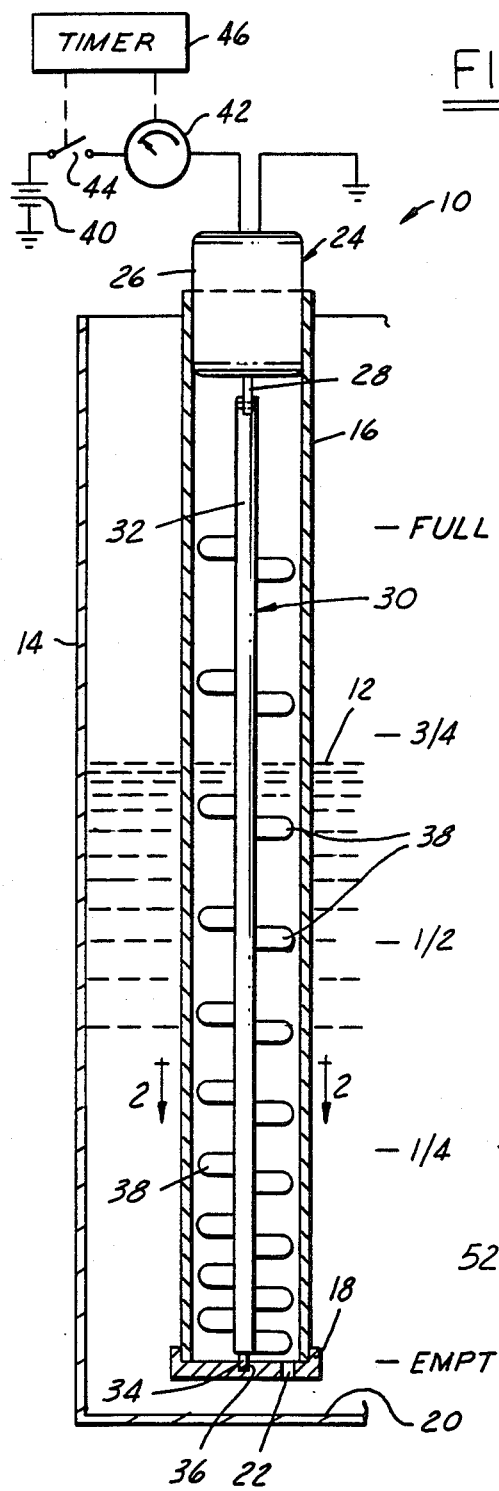
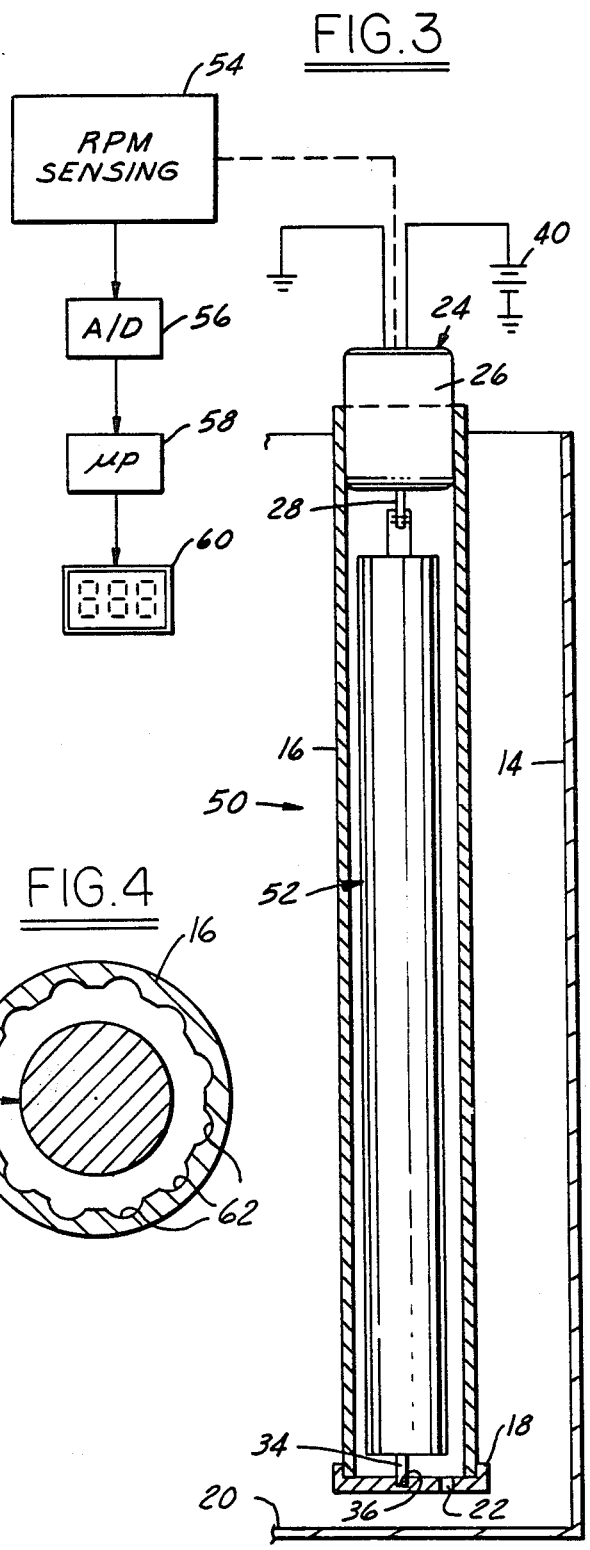

MOTOR-DRIVEN MATERIAL LEVEL INDICATOR

This application is a continuation-in-part of application Ser. No. 56,160 filed June 1, 1987.

The present invention is directed to measuring level of fluent material in a vessel, and more particularly to a motor-driven indicator which finds particular application for measuring fuel level in an automobile gasoline tank.

An object of the present invention is to provide a material level indicator which finds particular utility in measuring level of fuel in an automobile gasoline tank, which is economical to manufacture and assemble, which possesses reduced complexity and likelihood of failure, which may be readily repaired or replaced in the event of failure by relatively unskilled personnel, and which provides an accurate indication of material level over a wide range of operation conditions and over an extended operating lifetime.

The invention, together with additional objects, features and advantages thereof, will be best understood from the following description, the appended claims and the accompanying drawing in which:

FIG. 1 is a fragmentary sectional view in side elevation of material level indicating apparatus in accordance with a presently preferred embodiment of the invention;

FIG. 2 is a sectional view taken substantially along the line 2—2 in FIG. 1;

FIG. 3 is a fragmentary sectional view similar to that of FIG. 1 but illustrating a modified embodiment of the invention; and FIG. 4 is a sectional view taken substantially along the line 4—4 in FIG. 3.

FIGS. 1 and 2 illustrate a presently preferred embodiment 10 of apparatus for indicating level of material 12 in a vessel 14 as comprising a hollow cylindrical tube 16 affixed to vessel 14 (by means not shown) and extending vertically through a major portion of the vessel height. An end cap 18 is affixed to the lower end of tube 16 at a position spaced from the vessel bottom 20 and has an aperture 22 for admitting material 12 to the interior of tube 16. In the preferred application of the invention for measuring the level of gasoline in an automobile tank, tube 16 and aperture 22 have the advantage of isolating the level indicating apparatus carried interiorly of tube 16 from transient level variations due to vibrations, cornering, road undulations, etc.

An electric motor 24 includes a housing 26 pressfitted or otherwise internally affixed within the open upper end of tube 16 and a motor shaft 28 projecting into tube 16 coaxially therewith. An impeller 30 includes a shaft 32 pinned or otherwise affixed at its upper end to motor shaft 28 and extending vertically downwardly through tube 16 coaxially therewith. A pin 34 projects from the lower end of impeller shaft 32 and is journalled within a central pocket 36 on cap 18 for rotatably supporting the lower end of impeller 30. A plurality of vanes 38 integrally project radially outwardly of impeller shaft 32. Each vane 38 is of relatively thin cross section as viewed in the axial direction (FIG. 2) and has opposed flat tangentially-facing surfaces for engaging material 12 within tube 16 as impeller 30 is rotated by motor 24. In the embodiment of the invention illustrated in FIG. 1, vanes 38 are of identical geometry. Current is applied to motor 24 from a battery 40 or the like, and an ammeter 42 is connected between power source 40 and motor 24.

In order to extend the operating life of motor 24, a normally open switch 44 is connected between battery 40 and the motor windings and is coupled to a timer 46 for selective periodic closure. For example, switch 44 may be closed to apply current to motor 24 for thirty seconds every fifteen minutes. In this way, the fuel level reading is updated every fifteen minutes, which is sufficient for typical automotive applications, while the motor is otherwise deenergized. Timer 46 is also coupled to meter 42 so that the latter will retain level readings between up-date periods. Alternatively, meter 42 may be of a conventional type which retains readings when power is removed therefrom.

In operation, and with switch 44 closed, current is continuously applied to motor 24 for rotating shaft 28 and impeller 30 coupled thereto. However, drag on impeller 30 and consequent load applied to motor 24 vary with level of material 12 within vessel 14 and tube 16. More specifically, as the level of material 12 increases, surface drag on impeller shaft 32 increases accordingly, as does resistance to rotation presented by vanes 38. As the load on motor 24 increases, the current drawn thereby from battery 40 increases correspondingly, such that ammeter 42 provides a direct indication of material level as a function of current drawn by motor 24. In the preferred embodiment of the invention illustrated in FIG. 1, vanes 38 are spaced from each other as a non-linear function of distance lengthwise of the impeller axis. Such spacing is coordinated with cross-sectional contour of vessel 14 and the load v. current characteristics of motor 24 so as to calibrate ammeter 42 to indicate actual material level. Range and graduations in a working embodiment of the invention are illustrated along the right-hand edge of FIG. 1.

FIGS. 3 and 4 illustrate a modified embodiment 50 wherein reference numerals identical to those employed in FIGS. 1 and 2 indicate correspondingly identical components. In the embodiment of FIGS. 3 and 4, impeller 52 comprises a shaft of enlarged diameter having a smooth or uninterrupted (by fins or the like) outer surface for enhanced surfacearea frictional contact with material within tube 16. Shaft 52 is mounted for rotation about its axis coaxially with surrounding tube 16. A velocity sensing transducer 54 is coupled to motor 24 for measuring angular velocity or RPM of motor output shaft 28 and providing a corresponding velocity measurement signal to an A/D converter 56. A microprocessor 58 receives the speed-indicating output of converter 56 and provides a corresponding level signal to a digital gauge 60. Microprocessor 58 may include prestored information in the form of a look-up table or the like for relating motor speed to material level and thereby calibrating apparatus 50 to the cross-sectional geometry of vessel 14 as well as the speed-versus-load characteristics of motor 24. In operation or the embodiment of FIG. 3, increasing level of material within vessel 14 and tube 16 translates into increased frictional drag on impeller 52 and a corresponding decrease in motor angular velocity. Such velocity decrease is translated by microprocessor 58 into an indication of material level within vessel 14, which is then indicated at display 60.

In level indication apparatus of the subject type, where the impeller is closely surrounded by a tube to isolate the impeller from transient level variations (e.g., during cornering), a problem is encountered in that the fluid begins moving with the impeller. Such fluid movement reduces drag on the impeller, and thereby tends to give inaccurate readings. Moreover, the impeller acts as a centrifugal pumping element in cooperation with fluid surface tension and actually raises fluid level within the tube as compared with the surrounding external volume.

In order to overcome these two problems associated with motion of fluid following the impeller, the indicator 50 of FIG. 3 features a tube 16 having a series of angularly spaced axially extending flutes 62 (FIG. 4) in a circumferential series on the inner wall surface of tube 16 surrounding impeller 52. In a working embodiment of apparatus 50, flutes 62 have a depth, measured radially of the axis of rotation of impeller 52, which is substantially one-third of the flute circumferential dimension. The circumferential length of the wall surface lands between adjacent flutes 62 is substantially equal to radial flute depth. All flutes 62 are identical and are angularly evenly spaced from each other circumferentially of the impeller axis. It has been found that flutes 62 effectively prevent circulation of fluid following motion of impeller 52, and thereby yield a more accurate level indication.

As noted hereinabove, the present invention finds particular utility in fuel level sensors for automobile gasoline tanks. However, it will be apparent to persons skilled in the art that the principles of the invention may be readily applied to measurement and indication of level of other fluent materials, including both liquid and pulverulent materials. In many such applications, switch 44 may be closed manually to obtain readings only when desired. In a modification to the embodiment of FIG. 1, impeller vanes 38 may be uniformly spaced from each other lengthwise of the impeller axis but of differing geometries as viewed from the radial direction for tailoring load variation on motor 24 as a function of material level. In another modification to the embodiment of FIG. 1, the impeller vanes may be of continuous construction axially of the impeller but of varying radial dimension.

The invention claimed is:

1. Apparatus for indicating level of fluent material in a vessel comprising:
   an electric motor having a housing affixed to said vessel against rotation and a motor output shaft,
   an impeller extending vertically through at least a major portion of said vessel in physical contact with material in said vessel, said impeller having a continuous substantially cylindrical outer surface with one end coupled to said motor output shaft for rotating said impeller about its axis of said outer surface,
   means for applying electrical energy to said motor for rotating said shaft and impeller, resistance to rotation of said impeller and load applied by said impeller by said motor varying as a continuing direct function of level of material in said vessel,
   means for measuring load applied to said motor by said impeller and indicating level of material in said vessel as a function thereof; and
   a hollow cylindrical tube surrounding said impeller coaxially with said impeller surface through axial extent of said impeller and isolating said impeller from transient variations in material level in the vessel, said tube having an internal cylindrical wall opposite and coaxially with said impeller surface with a circumferential array of uniformly spaced identical axially extending flutes in said tube wall circumferentially surrounding said impeller.

2. The apparatus set forth in claim 1 wherein each of said flutes has a circumferential dimension at said wall surface substantially equal to three-times depth of said flutes radially of said impeller axis.

3. The apparatus set forth in claim 2 wherein land surface of said wall between adjacent flutes is substantially equal to said depth.

4. The apparatus set forth in claim 1 wherein said load-measuring means comprises means for measuring current drawn by said motor from said energy-applying means.

5. The apparatus set forth in claim 1 wherein said load-measuring means comprises means for measuring speed of rotation of said motor output shaft.

6. The apparatus set forth in claim 1 wherein said impeller is constructed in coordination with geometry of said vessel such that said load applied to said motor varies as predetermined function of level of material in said vessel.

7. The apparatus set forth in claim 1 wherein said energy-applying means comprises switch means for selectively applying electrical energy to said motor.

8. The apparatus set forth in claim 7 further comprising means coupled to said switch means for applying energy to said motor and updating said level-indicating means at selected periodic intervals.

* * * * *

UNITED STATES PATENT AND TRADEMARK OFFICE
CERTIFICATE OF CORRECTION

PATENT NO. : 4,827,768
DATED : May 9, 1989
INVENTOR(S) : Charles H. Tuckey

It is certified that error appears in the above—identified patent and that said Letters Patent is hereby corrected as shown below:

Col. 4, Line 7, change "by" to "to".

Signed and Sealed this

Twenty-eighth Day of November 1989

Attest:

JEFFREY M. SAMUELS

Attesting Officer    Acting Commissioner of Patents and Trademarks